United States Patent
Yin et al.

(10) Patent No.: US 9,972,094 B2
(45) Date of Patent: May 15, 2018

(54) FOREGROUND EXTRACTING METHOD AND APPARATUS

(71) Applicant: Hanwha Techwin Co., Ltd., Changwon-si (KR)

(72) Inventors: ShiMin Yin, Changwon-si (KR); YeonGeol Ryu, Changwon-si (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 78 days.

(21) Appl. No.: 15/152,969

(22) Filed: May 12, 2016

(65) Prior Publication Data
US 2017/0076171 A1 Mar. 16, 2017

(30) Foreign Application Priority Data
Sep. 14, 2015 (KR) ........................ 10-2015-0129779

(51) Int. Cl.
*G06T 7/00* (2017.01)

(52) U.S. Cl.
CPC .. *G06T 7/0083* (2013.01); *G06T 2207/20144* (2013.01)

(58) Field of Classification Search
None
See application file for complete search history.

(56) References Cited

U.S. PATENT DOCUMENTS

| | | | | |
|---|---|---|---|---|
| 5,142,362 A | * | 8/1992 | Masera | H04N 21/236 348/700 |
| 5,838,839 A | * | 11/1998 | Seki | G06K 9/6202 382/205 |
| 6,627,371 B2 | * | 9/2003 | Hasegawa | G03G 5/10 399/297 |
| 8,254,678 B2 | | 8/2012 | Yun | |
| 2006/0041502 A1 | * | 2/2006 | Blair | G06F 17/227 705/37 |
| 2006/0285754 A1 | * | 12/2006 | Steinberg | G06K 9/0061 382/224 |

(Continued)

FOREIGN PATENT DOCUMENTS

| KR | 0160196 B1 | 3/1999 |
|---|---|---|
| KR | 10-0208984 B1 | 7/1999 |

(Continued)

OTHER PUBLICATIONS

Machine Translation of KR 10-1586452 B1.*

*Primary Examiner* — Michelle M Entezari
(74) *Attorney, Agent, or Firm* — Sughrue Mion, PLLC

(57) ABSTRACT

A foreground extracting method is provided. The foreground extracting method includes: generating a plurality of sampling images; detecting contours from the sampling images to generate a plurality of contour images including a current frame and a previous frame; comparing first positions of a first plurality of pixels in a first decision-making area of the current frame with second positions of a second plurality of pixels in a second decision-making area of the previous frame; determining directions from the second positions to the first positions and distances between the first positions and the second positions; excluding, from the first decision-making area, at least one pixel of the first plurality of pixels in response to the distance of the at least one pixel being less than or equal to a preset critical magnitude.

13 Claims, 24 Drawing Sheets

(56) References Cited

U.S. PATENT DOCUMENTS

| | | | |
|---|---|---|---|
| 2008/0080743 A1* | 4/2008 | Schneiderman | G06F 17/30793 382/118 |
| 2014/0153829 A1* | 6/2014 | Pham | G06K 9/34 382/173 |
| 2015/0043786 A1* | 2/2015 | Ohki | H04N 5/23254 382/107 |
| 2015/0144693 A1* | 5/2015 | Li | G06K 7/10722 235/437 |

FOREIGN PATENT DOCUMENTS

| | | |
|---|---|---|
| KR | 10-0290946 B1 | 9/2001 |
| KR | 10-1035990 B1 | 5/2011 |
| KR | 101586452 B1 * | 1/2016 |

* cited by examiner

FOREGROUND EXTRACTING METHOD AND APPARATUS

CROSS-REFERENCE TO RELATED APPLICATION

This application claims priority from Korean Patent Application No. 10-2015-0129779, filed on Sep. 14, 2015 in the Korean Intellectual Property Office, the disclosure of which is incorporated herein by reference in its entirety.

BACKGROUND

1. Field

Apparatuses and methods consistent with exemplary embodiments relate to detecting a foreground and a background from an image and extracting the foreground from the image.

2. Description of the Related Art

Along with the increasing use of surveillance cameras, a technique for exactly extracting a target object (e.g., a person) from an image is becoming more important. For this, a preprocessing process is performed to separate a foreground and a background from an image. If foreground pixels are more accurately extracted, the accuracy in detecting target objects may be enhanced.

SUMMARY

One or more exemplary embodiments provide a method and apparatus for extracting a foreground from an image at a high speed using fewer resources.

According to an aspect of an exemplary embodiment, there is provided a foreground extracting method including: sampling an input image at a plurality of resolutions to generate a plurality of sampling images; detecting contours respectively from the sampling images to generate a plurality of contour images comprising a current frame and a previous frame that precedes the current frame by a preset interval; comparing first positions of a first plurality of pixels in a first decision-making area of the current frame with second positions of a second plurality of pixels in a second decision-making area of the previous frame; determining directions from the second positions to the first positions and distances between the first positions and the second positions; excluding, from the first decision-making area, at least one pixel of the first plurality of pixels in response to the distance of the at least one pixel being less than or equal to a preset critical magnitude; and setting the first decision-making area having a highest resolution as a foreground area.

The input image may be a motion picture including a plurality of frames, and the plurality of frames may include the current frame and the previous frame. The comparing and the determining may be repeated while sequentially increasing resolution from a lowest resolution to the highest resolution, and the first decision-making area encompasses an entire area of the current frame when the current frame has the lowest resolution.

The preset interval may decrease as the resolution of the current frame increases. For example, the preset interval may be inversely proportional to the resolution of the current frame.

The foreground extracting method may further include extracting a foreground by calculating motion paths of pixels included in the foreground area based on the directions and the distances and selecting at least one of the pixels in the foreground area as pixels of the foreground in response to the motion path of the at least one pixel satisfying a preset condition.

The preset condition may be satisfied in response to a length of the motion path of the at least one pixel being greater than or equal to preset critical length.

The preset condition may be satisfied in response to differences between motion directions of the pixels in the foreground area being less than or equal to a preset critical angle.

According to an aspect of another exemplary embodiment, there is provided a non-transitory computer-readable storage medium storing a computer program to execute the foreground extracting method.

According to an aspect of another exemplary embodiment, there is provided a foreground extracting apparatus including at least one processor to implement: a sampling image generator configured to sample an input image at a plurality of resolutions to generate a plurality of sampling images; a contour image generator configured to detect contours respectively from the sampling images to generate a plurality of contour images comprising a current frame and a previous frame that precedes the current frame by a preset interval; a calculator configured to compare first positions of a first plurality of pixels in a first decision-making area of the current frame with second positions of a second plurality pixels in a second decision-making area of the previous and determine directions from the second positions to the first positions and distances between the first positions and the second positions; a decision-making area manager configured to exclude, from the first decision-making area, at least one pixel of the first plurality of pixels in response to the distance of the at least one pixel being less than or equal to a preset critical magnitude; and a foreground area setting unit configured to set the first decision-making area having a highest resolution as a foreground area.

The input image may be a motion picture including a plurality of frames, and the plurality of frames may include the current frame and the previous frame. The calculator may be further configured to repeat the comparing and the determining while sequentially increasing resolution from a lowest resolution to the highest resolution, and the first decision-making area may encompass an entire area of the current frame when the current frame has the lowest resolution.

The preset interval set may decrease as the resolution of the current frame increases. For example, the preset interval may be inversely proportional to the resolution of the current frame.

The foreground extracting apparatus may further include a foreground extractor configured to extract a foreground by calculating motion paths of pixels included in the foreground area based on the directions and the distances and selecting at least one of the pixels as pixels of the foreground in response to the motion path of the at least one pixel satisfying a preset condition. The foreground extractor may be implemented by the at least one processor.

The preset condition may be satisfied in response to a length of the motion path of the at least one pixel being greater than or equal to a preset critical length.

The preset condition may be satisfied in response to differences between motion directions of the pixels in the foreground area being less than or equal to a preset critical angle.

Other aspects will become apparent and more readily appreciated from the accompanying drawings, claims, and detailed description.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
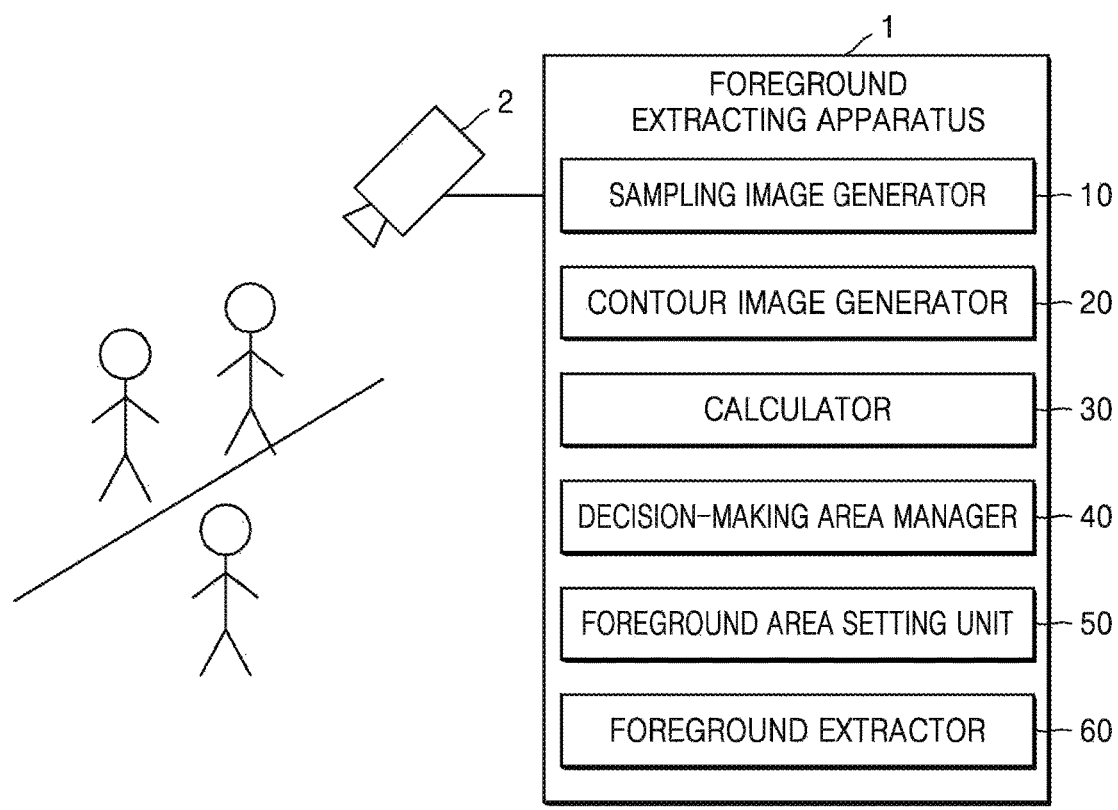
FIG. 1 is a block diagram illustrating a foreground extracting apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that although the terms "first" and "second" are used herein to describe various elements, these elements should not be limited by these terms. Terms are only used to distinguish one element from other elements.

In the following description, the technical terms are used only for explaining a specific exemplary embodiment while not limiting the inventive concept. The terms of a singular form may include plural forms unless referred to the contrary. The meaning of 'include' or 'comprise' specifies a property, a fixed number, a step, a process, an element, a component, and a combination thereof but does not exclude other properties, fixed numbers, steps, processes, elements, components, and combinations thereof.

The exemplary embodiments of the present disclosure may be embodied as functional blocks and various processing operations. The functional blocks may be implemented with various hardware and/or software configurations executing specific functions. The exemplary embodiments may employ integrated circuit configurations such as a memory, processing, logic, a look-up table and the like capable of executing various functions upon control of microprocessors or other control devices. In a similar manner to that in which the elements of the exemplary embodiments may be executed with software programming or software elements, the exemplary embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the exemplary embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

FIG. 1 is a block diagram illustrating a foreground extracting apparatus 1 according to an exemplary embodiment. Referring to FIG. 1, the foreground extracting apparatus 1 may include a sampling image generator 10, a contour image generator 20, a calculator 30, a decision-making area manager 40, a foreground area setting unit 50, and a foreground extractor 60. The foreground extracting apparatus 1 may be connected to an image acquisition device 2 via wired or wireless communication.

The image acquisition device 2 may photograph surrounding areas, scenes, or various objects (e.g., stationary objects such as floors, walls, or obstacles, or moving objects such as persons or animals). The image acquisition device 2 may be implemented as a camera including an image sensor.

The term "foreground extraction" may refer to a process of separating a foreground (e.g., target object) from a background of an image by using an image processing device to extract the foreground from the image. If the foreground is extracted more accurately, accuracy of the next processes such as recognition and tracing processes may also be improved. Thus, foreground extraction is important, and many techniques have been developed for foreground extraction.

In foreground extraction methods of the related art, an area of an image having a color difference is compared to a reference background image in which no object exists, and a foreground is extracted from the image based on the comparison. The reference background image may be also referred to as background model. Background models based on parametric and non-parametric statistics theories have been proposed in the related art of foreground extraction, and a parametric Gaussian Mixture Model (GMM) has been generally used as a background model.

However, if illumination varies quickly, the variation of illumination in a background model may be recognized as a motion of an object and thus may be extracted as a foreground. That is, in an environment in which illumination varies quickly, incorrect foregrounds are often extracted.

Figure 2A:
FIGS. 2A, 2B, 2C, and 2D are views illustrating results of foreground extraction performed using a technique of the related art in an environment in which illumination varies quickly.
Figure 2B:
Figure 2C:
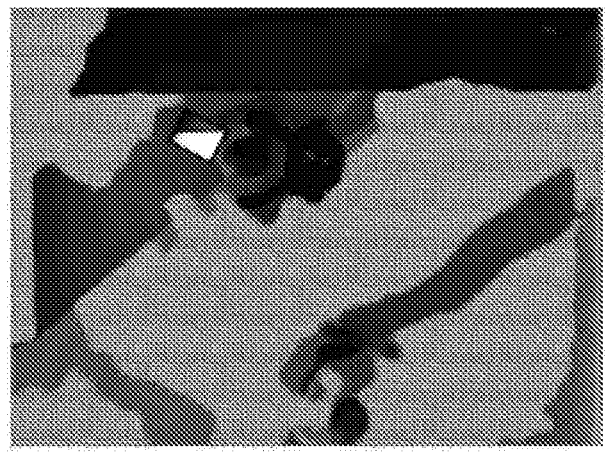
Figure 2D:
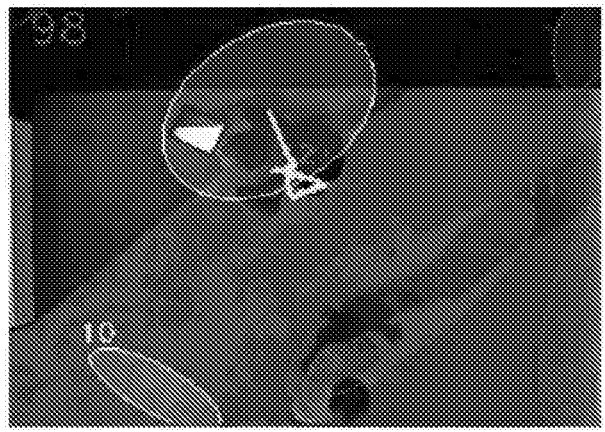

FIGS. 2A, 2B, 2C, and 2D are views illustrating results of foreground extraction performed using a technique of the related art in an environment in which illumination varies quickly. According to the technique of the related art, if illumination varies momentarily from a bright level of light (refer to FIG. 2A) to a dark level of light (refer to FIG. 2), an area in which no object exists may be recognized as a foreground as shown in FIG. 2C. In FIG. 2C, an area colored bright may be recognized as a background, and the other area may be recognized as a foreground. That is, in addition to an area in which an object actually exists, an area such as a shadow area may also be recognized as a foreground area. FIG. 2D illustrates areas extracted as foregrounds. Referring to FIG. 2D, an area wider than an actual object area is extracted as a foreground, and even an area in which no object exists is extracted as a foreground.

According to the exemplary embodiment, incorrect foreground extraction may be prevented by distinguishing a foreground and a background based on motions of pixels rather than color intensity variations of pixels. To this end, a plurality of frames having different resolutions and capture times may be compared with each other so as to quickly and precisely extract a foreground.

Figure 3:
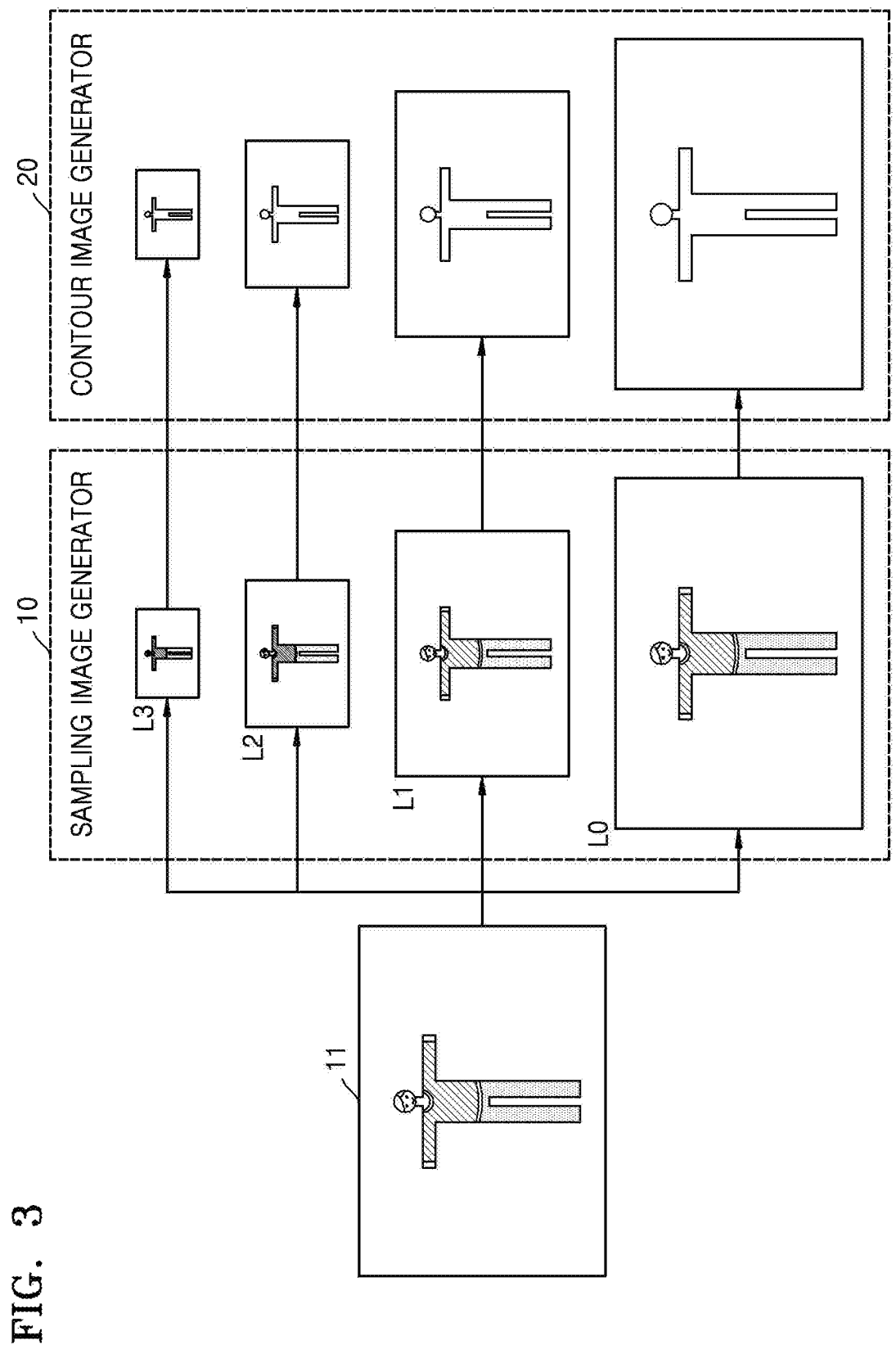
FIG. 3 is a view illustrating operations of a sampling image generator and a contour image generator according to an exemplary embodiment.

FIG. 3 is a view illustrating operations of the sampling image generator 10 and the contour image generator 20 according to an exemplary embodiment.

The sampling image generator 10 generates a plurality of sampling images by sampling an input image 11 at a plurality of resolutions.

The term "sampling" may refer to the process of resizing an image such as downsizing or downsampling.

The term "resolution" may refer to the total number of pixels in an image and may be expressed by the number of horizontal pixels×the number of vertical pixels, or the total number of pixels.

The sampling image generator 10 generates sampling images having various resolutions, that is, various pixel numbers, from the input image 11.

For example, the sampling image generator 10 may generate sampling images having four resolutions L0, L1, L2, and L3, which correspond to resolutions of 640×480, 320×240, 160×120, and 80×60, respectively. In this case, the resolution of the input image 11 may have resolution L0. However, this is a non-limiting example.

The sampling image generator 10 may generate the sampling images from the input image 11 by a method such as a bilinear, bicubic interpolation. However, the sampling image generator 10 is not limited thereto.

The contour image generator 20 generates a plurality of contour images by respectively detecting contours from the sampling images generated by the sampling image generator 10. In the case of the above-described example, the contour image generator 20 may generate contour images having four resolutions by extracting only contours from the sampling images having four resolutions generated by the sampling image generator 10.

The contour image generator 20 may generate the contour images from the sampling images by any method. That is, the contour image generator 20 is not limited to using a particular contour image generating method.

The sampling image generator 10 and the contour image generator 20 generate sampling images and contour images for each frame.

Referring back to FIG. 1, the calculator 30 performs a calculation operation on contour images having one of the plurality of resolutions. The calculator 30 may calculate the direction and magnitude of motion of a target object in a decision-making area of a contour image by comparing the positions of pixels corresponding to the target object in the current frame of the contour image with the positions of pixels corresponding to the target object in a previous frame of the contour image which precedes the current frame by a preset interval.

Figure 4:
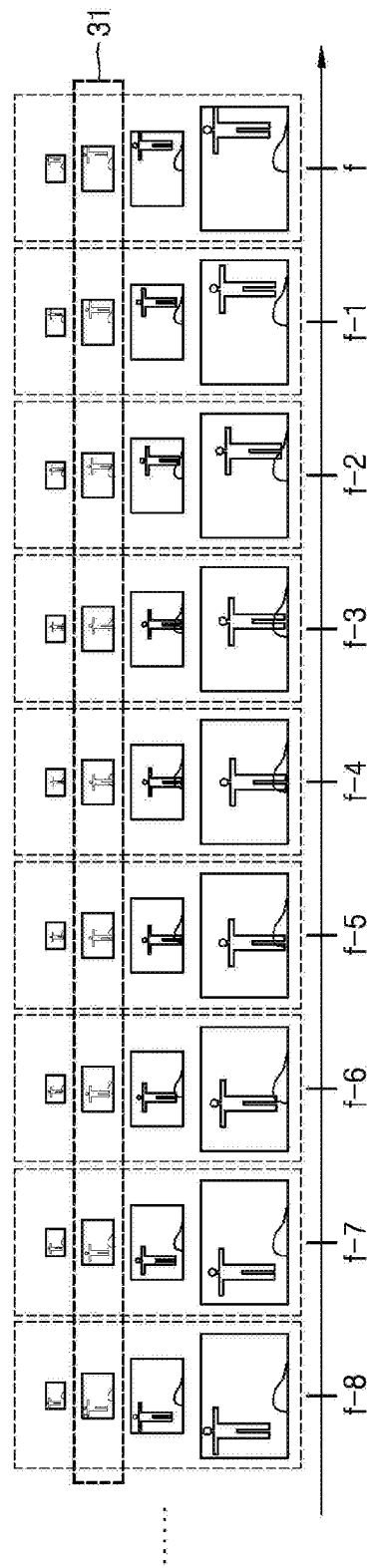
FIG. 4 is a view illustrating contour images of frames in time sequence from the eighth previous frame to the current frame.
Figure 5:
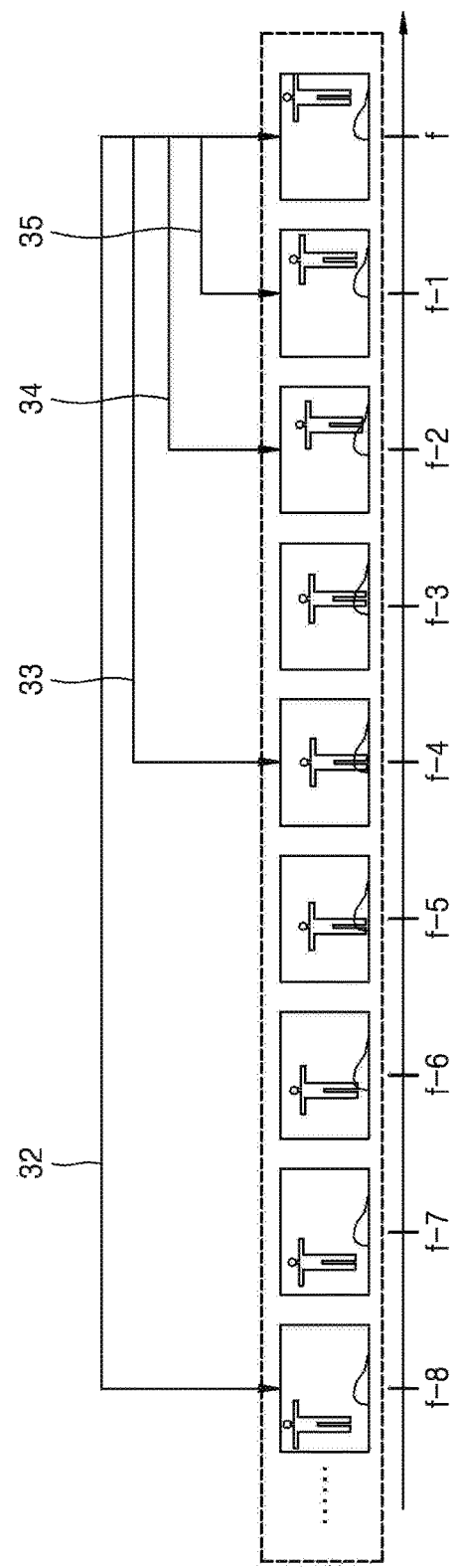
FIG. 5 is a view illustrating how a calculator decreases a preset interval as the resolution of contour images increases.

FIGS. 4 to 6 illustrate how the calculator 30 calculates the direction and magnitude of motion of a target object in a decision-making area.

FIG. 4 illustrates contour images of frames in time sequence from the eighth previous frame f-8 to the current frame f. In this case, the calculator 30 may calculate the direction and magnitude of movement of a target object using contour images having one of a plurality of sampling resolutions. For example, the calculator 30 may calculate the direction and magnitude of the movement using contour images 31 having a resolution L2 described in the previous example. In this case, pixels included in a decision-making area are the subjects of calculation of motion direction and magnitude, and the meaning of a decision-making area will be explained later.

The calculator 30 may repeatedly perform a calculation operation on contour images in the order of resolution by sequentially changing the contour images from those having the lowest resolution to those having the highest resolution. In this case, a preset interval between two frames, which are the subjects of pixel motion direction and magnitude calculation of the calculator 30, is decreased as the resolution of contour images increases.

FIG. 5 illustrates how the calculator 30 decreases the preset interval as the resolution of contour images increase. For example, the preset interval may be set to be inversely proportional to the resolution of contour images in such a manner that the preset interval is halved each time the resolution of contour images is doubled. For example, the preset interval is halved each time the horizontal and vertical resolutions of contour images are doubled. In the above-described example, when the direction and magnitude of movement of the target object are calculated from contour images having the lowest resolution L3, a comparison 32 may be made between a contour image of the current frame f and a contour image of the eighth previous frame f-8. The eighth previous frame f-8 precedes the current frame f by eight frames. Similarly, in the case of contour images having a resolution L2, a comparison 33 may be made between a contour image of the current frame f and a contour image of the fourth previous frame f-4. The fourth previous frame f-4 precedes the current frame f by four frames which is half of eight frames. Similarly, in the case of contour images having a resolution L1, a comparison 34 may be made between a contour image of the current frame f and a contour image of the second previous frame f-2, and in the case of contour images having a resolution L0, a comparison 35 may be made between a contour image of the current frame f and a contour image of the first previous frame f-1. In the above-described comparisons, pixels included in a decision-making area are the subjects of calculation of motion direction and magnitude, and the meaning of a decision-making area will be explained later.

Figure 6A:
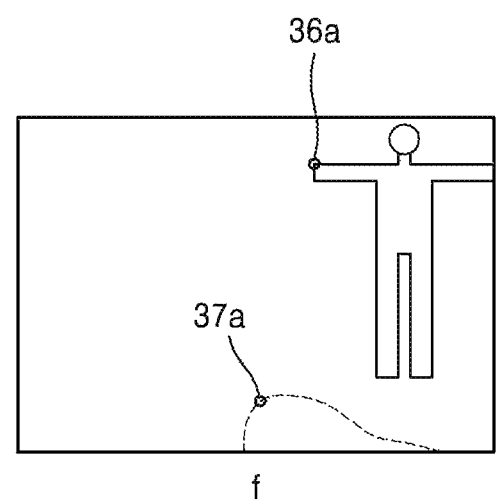
FIGS. 6A, 6B, and 6C are views illustrating how the calculator calculates the direction and magnitude of pixel motion by comparing two contour images having the lowest resolution.
Figure 6B:
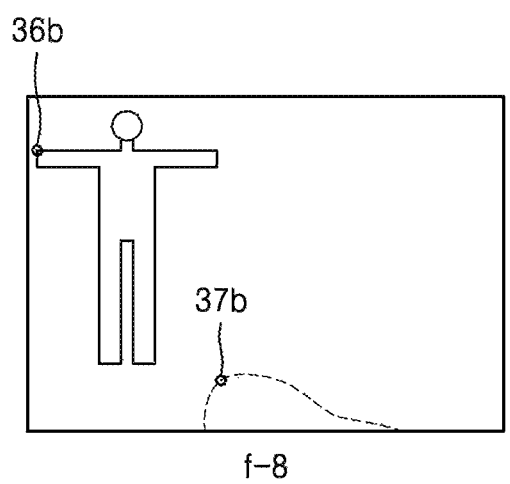
Figure 6C:
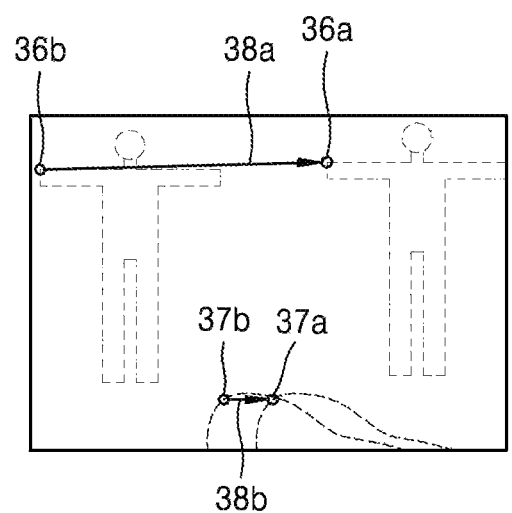

FIGS. 6A, 6B, and 6C illustrate how the calculator 30 calculates the direction and magnitude of pixel motion by comparing two contour images having the lowest resolution L3.

The decision-making area manager 40 sets the entire regions of the contour images having the lowest resolution L3 as a decision-making area. That is, the calculator 30 calculates the direction and magnitude of motion of a target object corresponding to contour lines in a contour image of the current frame f.

If a preset interval is set to be inversely proportional to the resolution of contour images as described in the above example and the resolution of the contour images is the lowest resolution L3, a comparison is performed between a contour image of the current frame f and a contour image of the eighth previous frame f-8.

For example, as shown in FIG. 6A, a pixel 36a describing the right hand of a person which is a foreground to be extracted may be detected as a contour pixel of a contour image of the current frame f, and a pixel 37a describing a shadow which is not the foreground may be detected as a contour pixel of the contour image of the current frame f. In this case, the calculator 30 may detect pixels 36b and 37b corresponding to the pixels 36a and 37a from a contour image of the eighth previous frame f-8 as shown in FIG. 6B. Thereafter, as shown in FIG. 6C, the calculator 30 may calculate the directions from the pixel 36b to the pixel 36a and from the pixel 37b to the pixel 37a, and may calculate the distances between the pixel 36b and the pixel 36a and between the pixel 37b and the pixel 37a, as shown by motion vectors 38a and 38b. For example, the calculator 30 calculates the directions and the magnitudes of the motion vectors 38a and 38b. The term "motion vector" may be also referred to as pixel motion.

If the magnitudes of the motion vectors 38a and 38b calculated by the calculator 30 are less than or equal to a preset critical magnitude, the decision-making area manager 40 may exclude the pixels 36a and 37a from the decision-making area.

Figure 7A:
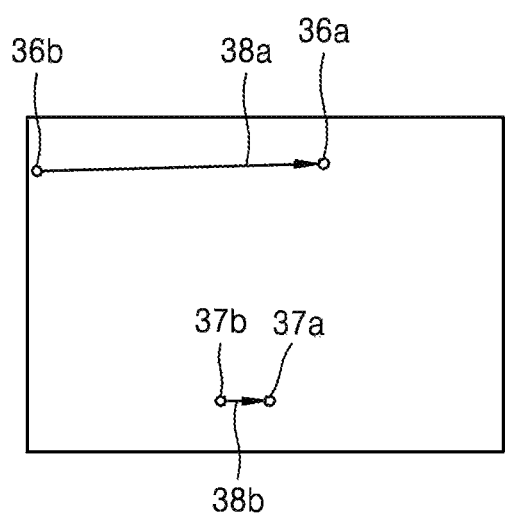
FIGS. 7A and 7B are views illustrating how pixels whose motion magnitudes are smaller than a preset critical magnitude are excluded from a decision-making area by a decision-making area manager.
Figure 7B:
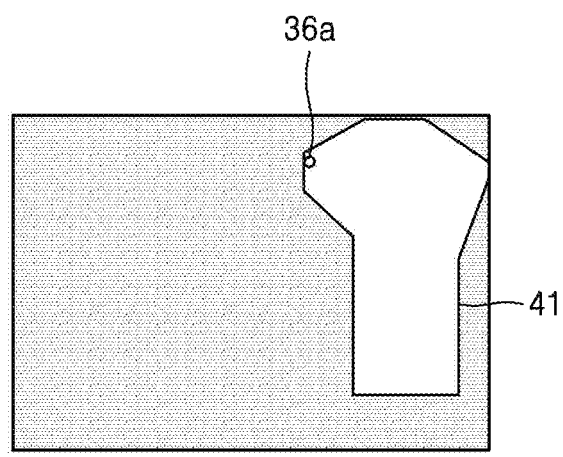

FIGS. 7A and 7B illustrate a method of excluding pixels that have motion magnitudes that is less than or equal to a preset critical magnitude from a decision-making area.

Referring to FIG. 7A, it is assumed that the preset critical magnitude is less than or equal to the magnitude of the vector 38a, and greater than or equal to the magnitude of the vector 38b. In this case, the decision-making area manager 40 does not exclude the pixel 36a from the decision-making area but excludes the pixel 37a from the decision-making area because the motion magnitude of the pixel 37a is equal to or smaller than the critical magnitude.

The critical magnitude may be set by a user. For example, the critical magnitude may be set based on an average walking speed of a human. However, the critical magnitude may be varied according to environments in which the image acquisition device 2 is disposed.

FIG. 7B illustrates an example in which the decision-making area manager 40 excludes a pixel, which has a motion magnitude that is less than or equal to the critical magnitude, from a decision-making area 41. That is, the decision-making area 41 includes pixels that have motion magnitudes greater than the preset critical magnitude, such as the pixel 36a.

The decision-making area 41 describes an approximate position and contour of an object in a contour image having the lowest resolution L3. However, a more accurate contour may be obtained from the decision-making area 41 as the resolution of the decision-making area 41 increases.

Figure 8A:
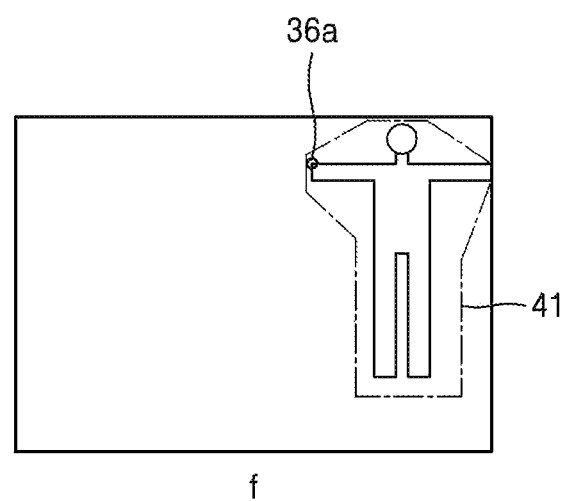
FIGS. 8A, 8B, and 8C are views illustrating how the calculator calculates the direction and magnitude of pixel motion by comparing two contour images having a resolution higher than the lowest resolution by one grade.
Figure 8B:
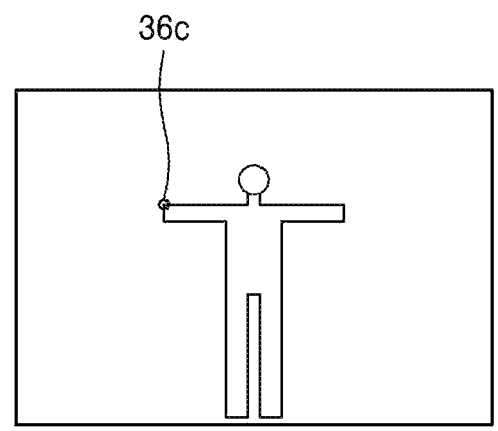
Figure 8C:
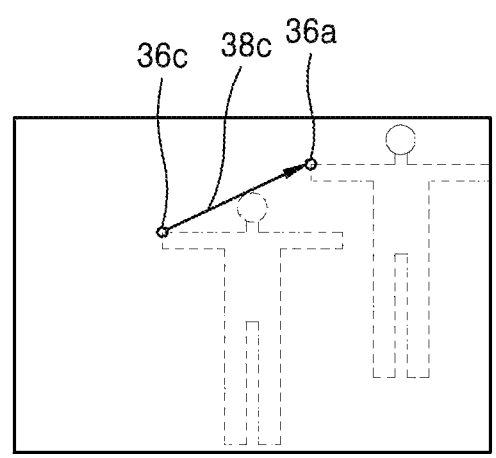

FIGS. 8A, 8B, and 8C illustrate how the calculator 30 calculates the direction and magnitude of pixel motion by comparing two contour images having a resolution L2 higher than the lowest resolution L3 by one grade.

In the case of contour images other than contour images having the lowest resolution L3, as described above, the decision-making area manager 40 sets a decision-making area using contour images having a previous resolution.

For example, in the case of contour images having a resolution L2, the calculator 30 calculates the direction and magnitude of pixel motion only for pixels included in the decision-making area 41 set by the decision-making area manager 40 using the contour images having the previous resolution L3 as shown in FIG. 8A. In this case, if the preset interval is inversely proportional to the resolution of the contour images as described in the above example, the calculator 30 compares a contour image of the fourth previous frame f-4 having a resolution L2 with a contour image of the current frame f having a resolution L2.

That is, the calculator 30 calculates the directions and magnitudes of motions of pixels included in the decision-making area 41 of the contour image of the current frame f by detecting the positions of corresponding pixels of the contour image of the fourth previous frame f-4.

In the above-described example, if the pixel 36a corresponding to the right hand of the person is detected from the contour image of the current frame f, the calculator 30 detects a pixel 36c corresponding to the pixel 36a from the contour image of the fourth previous frame f-4 as shown in FIG. 8B. Thereafter, as shown in FIG. 8C, the calculator 30 calculates the directions from the pixel 36c to the pixel 36a and the distances between the pixel 36c and the pixel 36a as shown by a motion vector 38c. For example, the calculator 30 calculates the direction and the magnitude of the motion vector 38c.

If the magnitude of the motion vector 38c is less than the preset critical magnitude, the decision-making area manager 40 excludes the pixel 36a from the decision-making area 41. The critical magnitude may be set by a user. In addition, the critical magnitude may be set to have different values according to image resolutions. For example, the critical magnitude may be decreased as the resolution of images increases. Since the decision-making area 41 is reduced as the resolution of images increases, the critical magnitude may be decreased according to the change of the decision-making area.

Figure 9A:
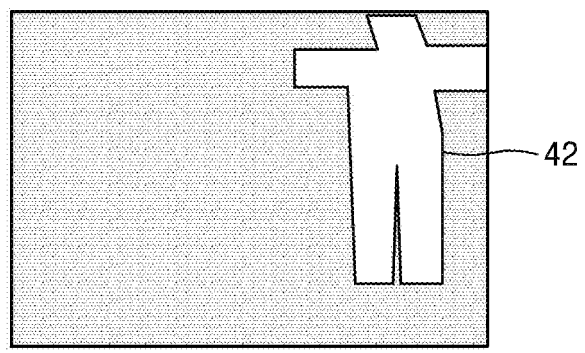
FIGS. 9A and 9B are views illustrating results after pixels whose motion magnitudes are smaller than a preset critical magnitude are excluded from a decision-making area by a decision-making area manager.
Figure 9B:
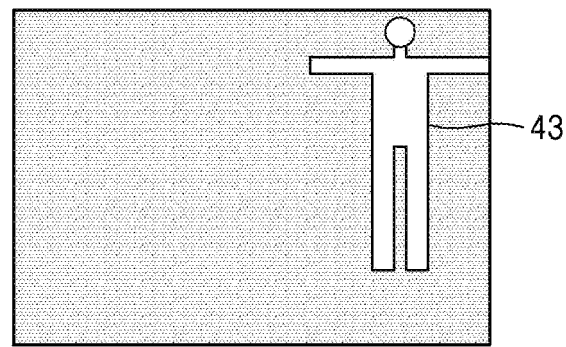

FIGS. 9A and 9B illustrate results when a decision-making area excludes pixels having motion magnitudes which are less than or equal to the preset critical magnitude. As shown in FIG. 9A, the decision-making area manager 40 detects a decision-making area 42 more similar to the contour of a foreground from a contour image having a resolution L2 by using the above-described method. The calculator 30 and the decision-making area manager 40 may repeat the above-described operations in the order of resolution from L3 to L0.

Referring to FIG. 9B, the decision-making area manager 40 ultimately detects a decision-making area 43 from a contour image having a resolution L0, and the decision-making area 43 is more similar to the object (i.e., the person) than the decision-making area 41 shown in FIG. 7B.

The foreground area setting unit 50 sets the decision-making area 43 detected from the contour image having the highest resolution L0 as a foreground area. For example, the foreground area setting unit 50 sets the decision-making area 43 as a foreground area after excluding at least one pixel from the decision-making area 43 when a distance of the at least one pixel between a first position in the decision-making area 43 of the current frame and a second position in a corresponding decision making area of a previous frame is less than or equal to a preset critical magnitude.

According to the exemplary embodiment, the foreground extracting apparatus 1 may extract the foreground area set by the foreground area setting unit 50 as a foreground. This configuration may be used when priority is given to high-speed processing. In addition, the foreground extracting apparatus 1 may further include the foreground extractor 60 so as to extract a foreground more accurately.

Referring back to FIG. 1, the foreground extractor 60 calculates motion paths of pixels included in a foreground area by using the directions and magnitudes of motions of the pixels calculated by the calculator 30 using contour images having a plurality of resolutions, so as to extract pixels whose motion paths satisfy a preset condition as pixels of a foreground.

Figure 10A:
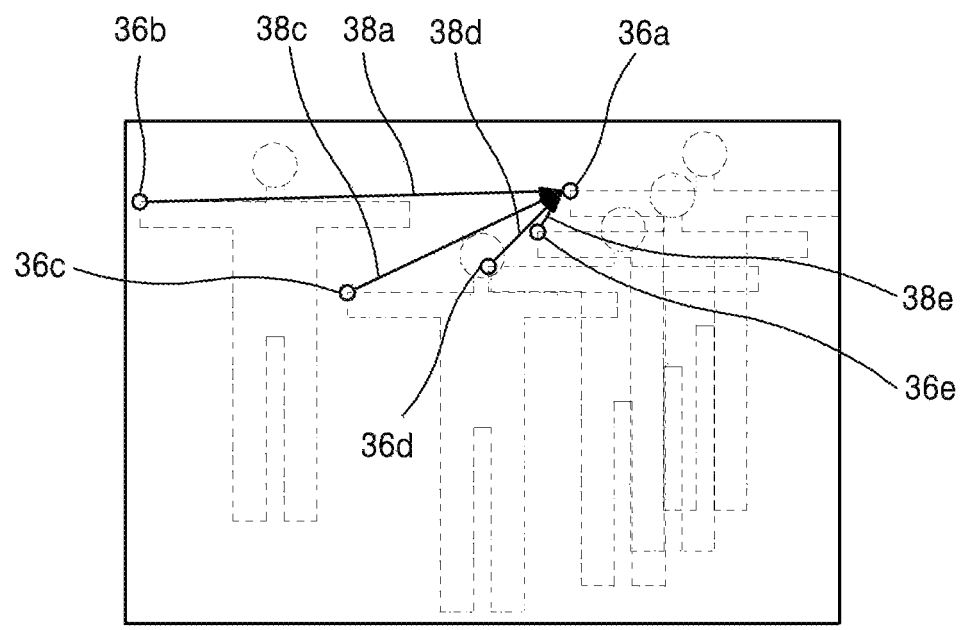
FIGS. 10A, 10B, and 10C are views illustrating how a foreground extractor calculates a motion path of a pixel and determines whether the motion path satisfies a preset condition.
Figure 10B:
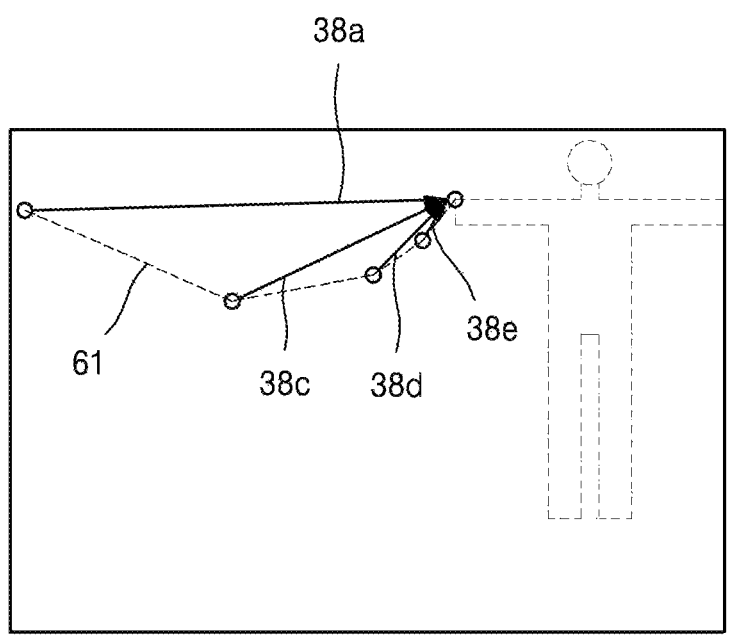
Figure 10C:
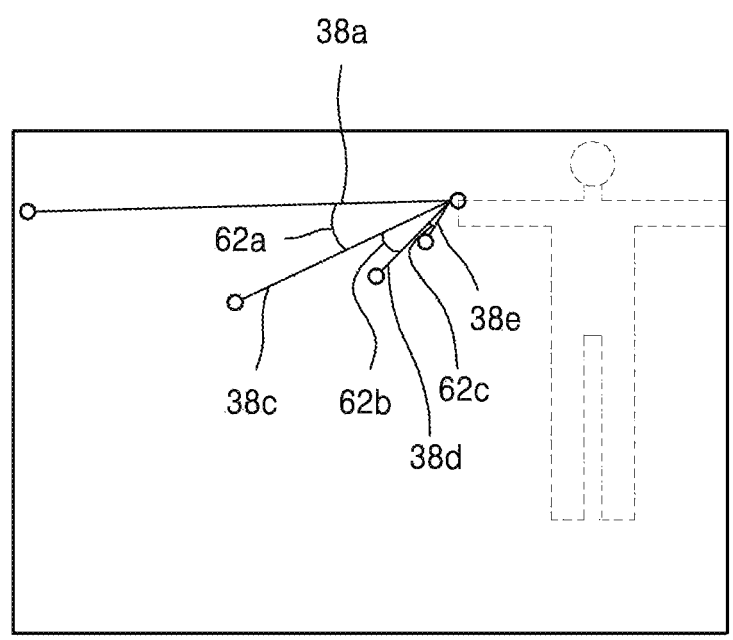

FIGS. 10A, 10B, and 10C illustrate how the foreground extractor 60 shown in FIG. 1 calculates a motion path of a pixel and determines whether the motion path satisfies the preset condition.

As described in the above example, if it is assumed that a pixel 36a is included in a foreground area, the foreground extractor 60 calculates a motion path 61 of the pixel 36a as shown in FIGS. 10A to 10C by using pixels detected by the calculator 30 from contour images having a plurality of resolutions, that is, using a pixel 36b (frame f-8, resolution L3), a pixel 36c (frame f-4, resolution L2), a pixel 36d (frame f-2, resolution L1), and a pixel 36e (frame f-1, resolution L0).

In this case, the preset condition may be satisfied when the length of the motion path 61 is greater than or equal to a preset critical length. That is, the foreground extractor 60 may select pixels of a foreground area whose motion path lengths are greater than or equal to the preset critical length so as to extract the pixels as pixels of a foreground.

Alternatively the preset condition may be satisfied when a difference between motion directions of pixels detected using contour images having a plurality of resolutions is less than or equal to a preset critical angle. That is, the foreground extractor 60 may select pixels having motion direction differences within the preset critical angle, such as pixels having motion direction differences 62a, 62b, and 62c between motion directions 38a, 38c, 38d, and 38e within the preset critical angle, and may extract the pixels as pixels of a foreground.

The critical length and the critical angle may be set by a user by taking into consideration the velocity of walking people and installation environments.

Figure 11A:
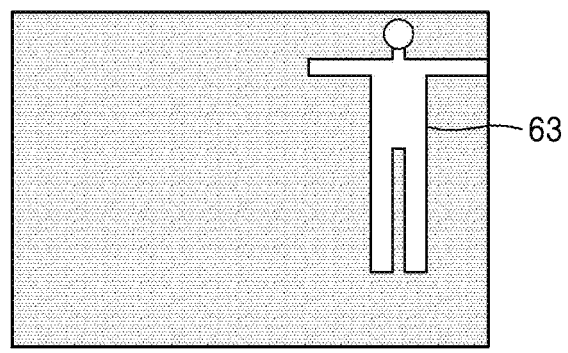
FIGS. 11A and 11B are views illustrating how the foreground extractor extracts a foreground by selecting pixels satisfying a preset condition from pixels of a foreground area.
Figure 11B:
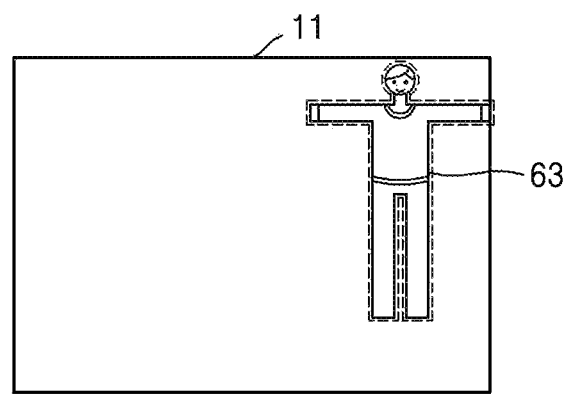

FIGS. 11A and 11B illustrate how the foreground extractor 60 extracts a foreground by selecting pixels satisfying the preset condition from pixels of a foreground area.

Referring to FIG. 11A, the foreground extractor 60 extracts pixels satisfying the preset condition from pixels of a foreground area and sets an extraction area 63 constituted by the extracted pixels. That is, as shown in FIG. 11B, the foreground extractor 60 extracts pixels corresponding to the extraction area 63 from an input image 11 as pixels of a foreground.

As described above, in the case of low-resolution images, images of frames having a long time interval therebetween are compared to exclude areas in which motion does not appear and thus to reduce the number of calculations to be performed on high-resolution images. That is, the speed of processing for extracting a foreground may be improved.

Figure 12:
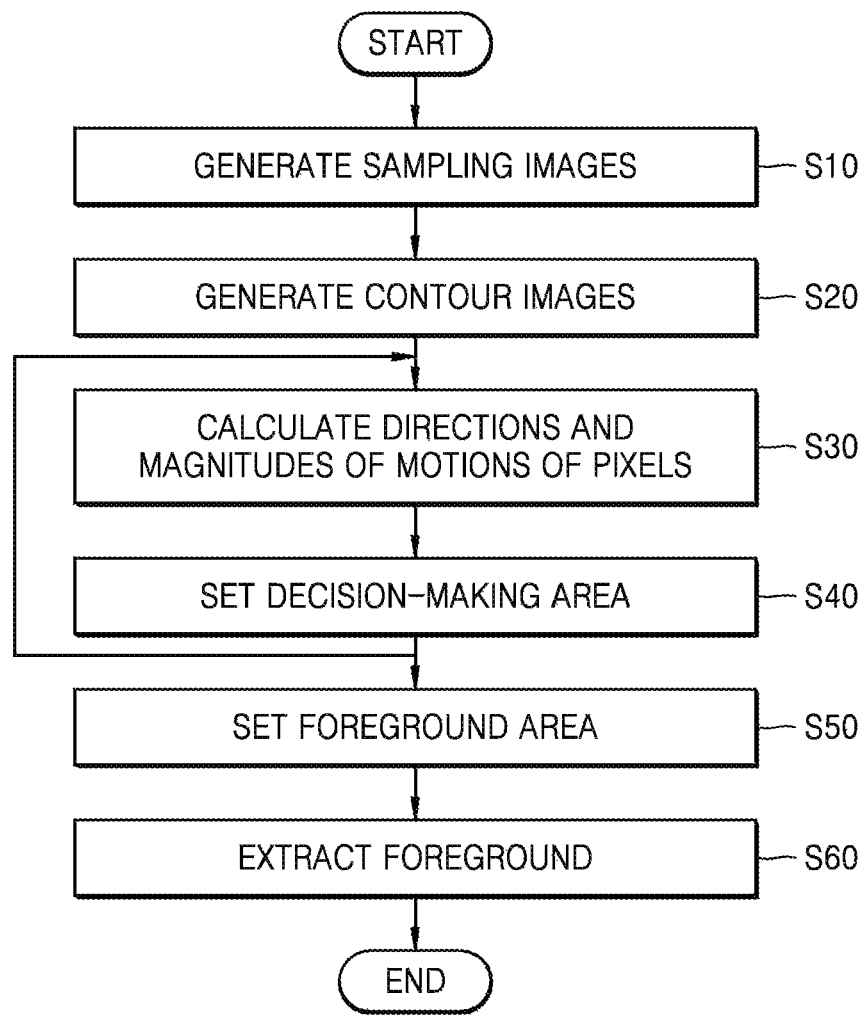
FIG. 12 is a flowchart illustrating a method of extracting a foreground using the foreground extracting apparatus according to an exemplary embodiment.

FIG. 12 is a flowchart illustrating a method of extracting a foreground using the foreground extracting apparatus 1. The same descriptions as those given above with reference to FIGS. 1 to 10 will not be repeated here.

The sampling image generator 10 generates a plurality of sampling images by sampling an input image 11 at a plurality of resolutions (operation S10). That is, the sampling image generator 10 generates sampling images having various resolutions (that is, various numbers of pixels) from the input image 11. For example, the sampling image generator 10 may generate sampling images having four resolutions L0, L1, L2, and L3, which correspond to resolutions of 640×480, 320×240, 160×120, 80×60, respectively.

The contour image generator 20 generates a plurality of contour images by respectively detecting contours from the sampling images generated by the sampling image generator 10 (operation S20). For example, the contour image generator 20 may extract contours from the sampling images having the four different resolutions and generate images including the extracted contours.

The sampling image generator 10 and the contour image generator 20 may generate sampling images and contour images for each frame.

The calculator 30 performs a calculation process on contour images having the same resolution so as to calculate the directions and magnitudes of motions of pixels of a decision-making area by comparing positions of the pixels of the decision-making area in a contour image of the current frame with positions of the pixels of the decision-making area in a contour image of a previous frame preceding the current frame by a preset interval (operation S30). In the case of contour images having the lowest resolution L3, the decision-making area may be the entire regions of the contour images. In the case of contour images other than the contour images having the lowest resolution L3, the decision-making area manager 40 sets a decision-making area using contour images having a previous resolution.

If the magnitudes of motions of pixels calculated by the calculator 30 are smaller than a preset critical magnitude, the decision-making area manager 40 excludes the pixels from the decision-making area (operation S40). That is, pixels not considered as pixels describing motion of people are excluded from the decision-making area. In this case, the critical magnitude used as a reference for making a decision may be set by a user. For example, the critical magnitude may be set based on an average velocity of walking people. However, the critical magnitude may be varied according to environments in which the image acquisition device 2 is disposed.

Calculation by the calculator 30 and management of the decision-making area by the decision-making area manager 40 may be repeated while sequentially changing contour images from those having the lowest resolution to those having the highest resolution. When the calculator 30 performs calculation, the preset interval may decrease as the resolution of contour images increases.

The foreground area setting unit 50 sets a decision-making area 43 calculated using the contour images having the highest resolution as a foreground area (operation S50).

In addition, the foreground extractor 60 extracts pixels satisfying a preset condition from pixels of the foreground area and sets an extraction area 63 constituted by only the extracted pixels. That is, the foreground extractor 60 extracts pixels corresponding to the extraction area 63 from the input image 11 as pixels of a foreground.

According to the exemplary embodiment, in the case of images having a relatively low resolution, images of frames having a relatively long time interval therebetween are compared so as to reduce the number of calculations to be performed on images having a relatively high resolution. That is, the speed of processing for extracting a foreground may be improved.

In the exemplary embodiment, various apparatuses may be used to extract a foreground. For example, the method of the exemplary embodiment may be used for people counting apparatuses, human tracking apparatuses, human recognizing apparatuses, and so on.

The foreground extracting method of the exemplary embodiment may also be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, and optical data storage. The computer readable recording medium may also be distributed over network coupled computer systems so that the computer readable code is stored and executed in a distributed fashion. Also, functional programs, codes, and code segments for accomplishing the exemplary embodiment may be easily construed by programmers skilled in the art.

At least one of the components, elements, modules or units represented by a block as illustrated in FIG. 1 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

According to the exemplary embodiment, foregrounds may be extracted from images at a high speed using fewer resources.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A foreground extracting method comprising:
sampling an input image at a plurality of different resolutions to generate a plurality of sampling images;
detecting contours respectively from the sampling images to generate a plurality of contour images comprising a current frame and a previous frame that precedes the current frame by a preset interval;
comparing first positions of a first plurality of pixels in a first decision-making area of the current frame with second positions of a second plurality of pixels in a second decision-making area of the previous frame;
determining directions from the second positions to the first positions and distances between the first positions and the second positions;
excluding, from the first decision-making area, at least one pixel of the second plurality of pixels in response to the distance of the at least one pixel being less than or equal to a preset critical magnitude; and
setting the first decision-making area having a highest resolution as a foreground area
wherein the preset interval decreases as a resolution of the current frame increase.

2. The foreground extracting method of claim 1, wherein the input image is a motion picture comprising a plurality of frames, and the plurality of frames comprises the current frame and the previous frame,
the comparing and the determining are repeated while sequentially increasing resolution from a lowest resolution to the highest resolution, and
the first decision-making area encompasses an entire area of the current frame when the current frame has the lowest resolution.

3. The foreground extracting method of claim 1, wherein the preset interval is inversely proportional to the resolution of the current frame.

4. The foreground extracting method of claim 1, further comprising extracting a foreground by calculating motion paths of pixels included in the foreground area based on the directions and the distances and selecting at least one of the pixels in the foreground area as pixels of the foreground in response to the motion path of the at least one pixel satisfying a preset condition.

5. The foreground extracting method of claim 4, wherein the preset condition is satisfied in response to a length of the motion path of the at least one pixel being greater than or equal to preset critical length.

6. The foreground extracting method of claim 4, wherein the preset condition is satisfied in response to differences between motion directions of the pixels in the foreground area being less than or equal to a preset critical angle.

7. A non-transitory computer-readable storage medium storing a computer program to execute the foreground extracting method of claims 1.

8. A foreground extracting apparatus comprising at least one processor to implement:
a sampling image generator configured to sample an input image at a plurality of different resolutions to generate a plurality of sampling images;
a contour image generator configured to detect contours respectively from the sampling images to generate a plurality of contour images comprising a current frame and a previous frame that precedes the current frame by a preset interval;

a calculator configured to compare first positions of a first plurality of pixels in a first decision-making area of the current frame with second positions of a second plurality pixels in a second decision-making area of the previous and determine directions from the second positions to the first positions and distances between the first positions and the second positions;

a decision-making area manager configured to exclude, from the first decision-making area, at least one pixel of the second plurality of pixels in response to the distance of the at least one pixel being less than or equal to a preset critical magnitude; and a foreground area setting unit configured to set the first decision-making area having a highest resolution as a foreground area, wherein the preset interval set decreases as the resolution of the current frame increases.

9. The foreground extracting apparatus of claim 8, wherein the input image is a motion picture comprising a plurality of frames, and the plurality of frames comprises the current frame and the previous frame, the calculator is further configured to repeat the comparing and the determining while sequentially increasing resolution from a lowest resolution to the highest resolution, and the first decision-making area encompasses an entire area of the current frame when the current frame has the lowest resolution.

10. The foreground extracting apparatus of claim 8, wherein the preset interval is inversely proportional to the resolution of the current frame.

11. The foreground extracting apparatus of claim 8, further comprising a foreground extractor configured to extract a foreground by calculating motion paths of pixels included in the foreground area based on the directions and the distances and selecting at least one of the pixels as pixels of the foreground in response to the motion path of the at least one pixel satisfying a preset condition, wherein the foreground extractor is implemented by the at least one processor.

12. The foreground extracting apparatus of claim 11, wherein the preset condition is satisfied in response to a length of the motion path of the at least one pixel being greater than or equal to a preset critical length.

13. The foreground extracting apparatus of claim 11, wherein the preset condition is satisfied in response to differences between motion directions of the pixels in the foreground area being less than or equal to a preset critical angle.

* * * * *